United States Patent [19]

Cook et al.

[11] Patent Number: 4,545,343
[45] Date of Patent: Oct. 8, 1985

[54] ANTITHEFT DEVICE FOR VEHICLES

[76] Inventors: John Cook; Harold Tate, Jr., both of Cottontown, Tenn. 37048; J. W. Graves, Springfield, Tenn. 37172

[21] Appl. No.: 649,304

[22] Filed: Sep. 11, 1984

[51] Int. Cl.⁴ ............................................. B60R 25/04
[52] U.S. Cl. ........................... 123/198 B; 123/179 M; 180/287; 307/10 AT
[58] Field of Search ...................... 123/198 B, 179 M; 180/287; 307/10 AT

[56] References Cited

U.S. PATENT DOCUMENTS

| | | | |
|---|---|---|---|
| 1,656,584 | 1/1928 | Hemingway, Jr. | 307/10 AT |
| 3,158,749 | 11/1964 | McAllister | 307/10 AT |
| 3,614,460 | 10/1971 | Hale | 307/10 AT |
| 3,654,602 | 4/1972 | Jones | 307/10 AT |
| 3,675,035 | 7/1972 | Brasty | 307/10 AT |
| 3,987,408 | 10/1976 | Sassover et al. | 307/10 AT |
| 4,063,610 | 12/1977 | Shilling | 307/10 AT |
| 4,175,635 | 11/1979 | Thomas | 307/10 AT |
| 4,186,710 | 2/1980 | Kilgore | 307/10 AT |
| 4,192,400 | 3/1980 | McEwan | 180/287 |
| 4,207,850 | 6/1980 | Wharton | 307/10 AT |
| 4,209,709 | 6/1980 | Betton | 180/287 |
| 4,292,541 | 9/1981 | Ambrosius | 307/10 AT |

Primary Examiner—Ira S. Lazarus
Attorney, Agent, or Firm—Finnegan, Henderson, Farabow, Garrett & Dunner

[57] ABSTRACT

An antitheft device is provided for vehicles having an engine, a battery and a starter solenoid contactor. The antitheft device includes an electrical starter assembly having a casing, a device for starting an engine by engaging a flywheel, and a servo controlled switch. Also included is an ignition key switch and an encoder and a decoder connected between the servo controlled switch and ignition key switch.

4 Claims, 1 Drawing Figure

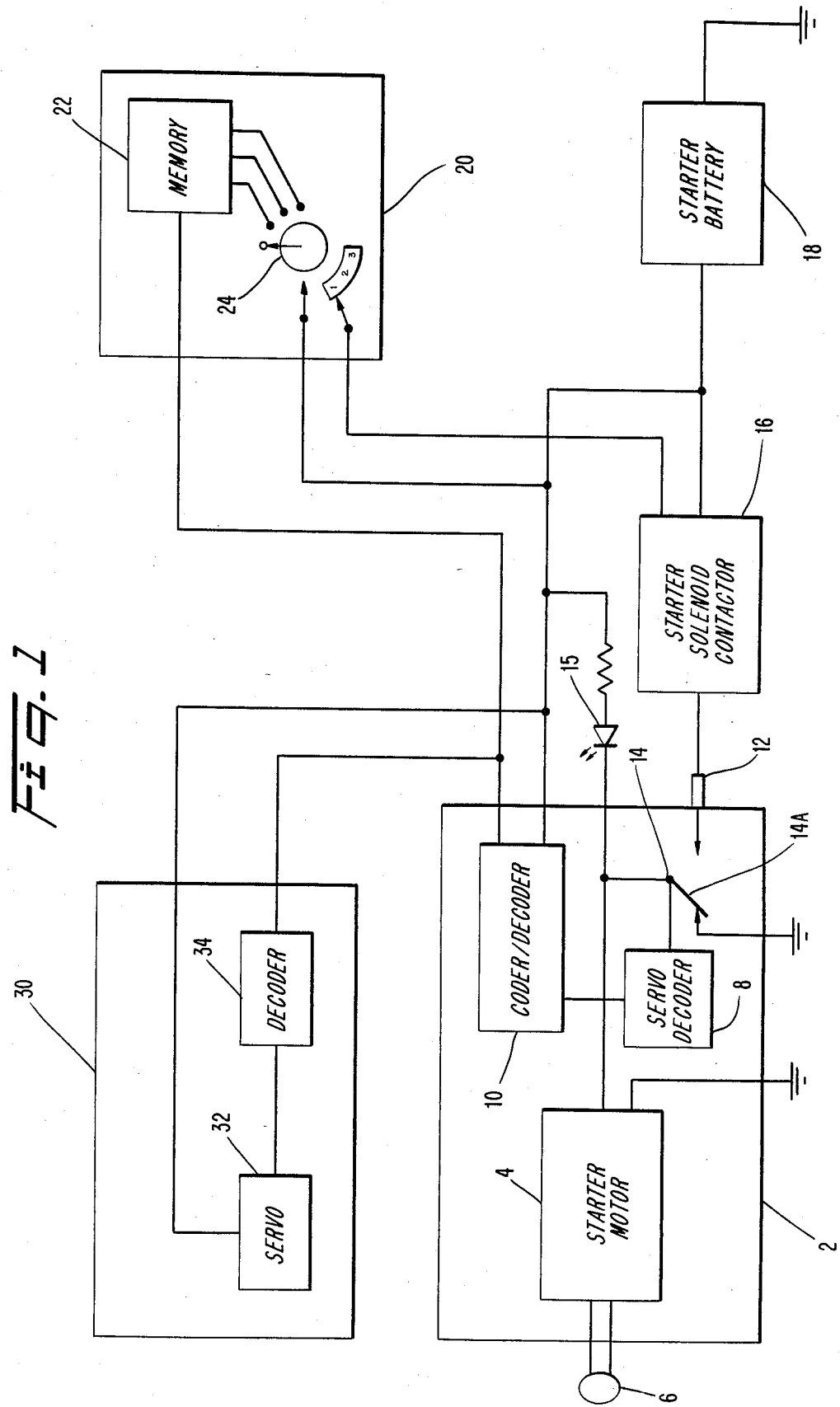

ANTITHEFT DEVICE FOR VEHICLES

BACKGROUND OF THE INVENTION

This invention relates, in general, to an antitheft device for vehicles and, more particularly, to a starter lock-out device having a switching system which simultaneously disconnects the starting battery from the starter (which consists of the vehicle's engine starting motor alone or in combination with the engine's ignition coil) and grounds the starter out. The device can utilize digital control means for preventing the energization of either the engine starting motor or the ignition coil or both unless the digital control means are manipulated to predetermined selected positions. The invention may also be used to disable the vehicle's fuel pump and to lock up the transmission and brakes of the vehicle.

Prior art antitheft devices for vehicles typically have the antitheft device separated from the starting system by electrical wires to relays, for example, or some other easily accessible electrical wires which can be cut and the starter system jumped by known means. Thus, the prior art devices can be by-passed readily thereby eliminating their effectiveness. Also, the ignition switch in prior art antitheft devices conducts all the current for starting the engine, typically 200–400 Amperes for cold starting, which requires a heavy duty type of ignition switch.

One prior art antitheft device has a switching system which simultaneously disconnects the starting battery from the starter and also grounds the starter out. See U.S. Pat. No. 4,186,710 to Kilgore. However, that prior art antitheft device does not attach directly to the starter in such a way so as to become a homogeneous part of the starter nor is it made as an internal part of the starter. As a homogeneous part of the starter, any attempt to remove or bypass the antitheft device described and claimed herein will render the starter inoperable thereby preserving the antitheft effectiveness of the device. Additionally, the Kilgore device requires a number of relays, switches and additional circuitry thereby adding to the expense of manufacturing the device.

Thus, an objective of the present invention is to provide an antitheft device for vehicles which is a homogeneous part of the starter.

Another objective of the present invention is to provide an antitheft device for vehicles that will render the starter inoperable due to any attempt to remove or bypass the antitheft device.

Additional objectives and advantages of the invention will be set forth in part in the description which follows, and in part will be obvious from the description, or may be learned by practice of the invention.

SUMMARY OF THE INVENTION

To achieve the foregoing objectives in accordance with the purpose of the invention, as embodied and broadly described herein, an antitheft device is provided for vehicles having an engine, a battery having a first pole and a second pole, and a starter solenoid contactor, wherein the first pole is connected to the vehicle frame and the starter solenoid contactor is connected to the second pole. The antitheft device comprises an electrical starter assembly having a casing, the electrical starter assembly including an electrical device for starting the engine, the electrical starting device having a first and second terminal and a device for engaging a flywheel, with the first terminal being connected to the vehicle frame, a grounding contact connected to the vehicle frame with the grounding contact being located in the casing, a power control arm located in the casing with the power control arm being connected to the starter solenoid contactor, and a main contact control arm located in the casing and resting on the grounding contact when the antitheft device is in a lock mode and contacting the power control arm when the antitheft device is in an unlock mode, with the main contact control arm being connected to the second terminal of the electrical starting device. This invention also includes an ignition key switch having third and fourth terminals, wherein the third terminal is electrically connected to the second pole of the battery, and the fourth terminal is electrically connected to the starter solenoid contactor. Also included in the present invention is a device for controlling and for locking and unlocking the main contact control arm, with the controlling device being coupled to the ignition key switch.

The controlling and locking device of the antitheft device can include a first servo having a link connected to the contactor control arm, with the first servo being located in the casing and electrically coupled to the key ignition switch. The antitheft device can also include an encoder and a decoder connected between the first servo and the ignition key switch with the decoder being located inside the casing and the encoder being located at the key ignition switch.

BRIEF DESCRIPTION OF THE DRAWINGS

The accompanying drawing, which is incorporated in and constitutes a part of this specification, illustrates a preferred embodiment of the invention and, together with the description, serves to explain the principles of the invention.

FIG. 1 is a block diagrammatic view of a preferred embodiment of the antitheft device for vehicles.

DETAILED DESCRIPTION OF THE PREFERRED EMBODIMENT

Reference will now be made in detail to a preferred embodiment of the invention, an example of which is illustrated in the accompanying drawing.

The present invention is used in combination with a motor vehicle having an engine, a battery and a starter solenoid contactor. Referring to FIG. 1, a preferred embodiment of the antitheft device is shown comprising starter assembly 2 which includes starter motor 4, gear to engage a flywheel 6 on the vehicle's engine, first servo 8, coder/decoder 10, power terminal 12 and switch 14. Servo 8, coder/decoder 10, and switch 14 are integrally constructed within starter assembly 2 so that an attempt to remove the device would render the starter motor 4 inoperable, since a computer code is required to make coder/decoder 10 activate servo 8 to thereby move switch 14 connecting starter motor 4 to power terminal 12. Thus this computer code is required to make starter motor 4 operate, and removing the antitheft device leaves starter motor 4 inoperable.

Main contact control arm 14A of switch 14 is connected to one electrical terminal of starter motor 4. The other electrical terminal of motor 18 is connected to the vehicle frame as ground reference.

External from the starter assembly is light emitting diode indicator 15 including a resistor, coupled to main contact control arm 14A of switch 14 and connected to one terminal of starter battery 18. The other terminal of battery 18 is electrically connected to the vehicle frame. Light emitting diode indicator 15 is for indicating that the antitheft device is in a lock-out mode. One of ordinary skill in the art would know how to design light emitting diode indicator 15 including a resistor, so as to not cause excessive drain on starter battery 18.

Starter solenoid contactor 16 is connected to battery 18 and coupled through power terminal 12 to switch 14. Key ignition switch 24 controls starter solenoid contactor 16. Starter solenoid contactor 16, when activated by key ignition switch 24, makes electrical contact so that current can flow from starter battery 18 through power terminal 12 and switch 14 to starter motor 4 when main contact control arm 14A of switch 14 is in the start or non-lock-out position. Thus, when switch 14 is in electrical contact with terminal 12, starter motor 4 turns gear to engage flywheel 6 causing the engine to start. When contact control arm 14A is in its start position, light emitting diode 15 is off. When arm 14A is in its lock-out position, that is when in direct electrical contact with ground, light emitting diode 15 is illuminated indicating the lock-out condition of the antitheft device.

A general purpose lock-out device 30 includes second servo 32 coupled to battery 18 and decoder 34 coupled to second servo 32. The general purpose lock-out device 30 is in a lock-out mode through control of decoder 34 and second servo 32. The general purpose lock-out device 30 unlocks when the proper code activates decoder 34. Any number of general purpose lock-out devices 30 can be used in connection with the antitheft device to further render the vehicle inoperable except upon proper operation of the antitheft device.

Processor 20 having a coder keypad includes programmable read-only memory (PROM) or other memory device 22 and key ignition switch 24. The coder keypad in processor 20 controls processor 20. Processor 20 is coupled to coder/decoder 10 and one or more decoders 34, if present. The coder keypad along with the PROM 22 generates codes for the coder/decoder and the various decoders, each code having a specific code group. By having the proper codes sent from processor 20 to coder/decoder 10 and decoders 34, first servo 8 and second servos 32 are activated, thereby allowing operation of the ignition system and unlocking general purpose lock-out devices 30, respectively.

In the operation of the present invention, with key ignition switch 24 in position 1, starter coder/decoder 10 sends a serial code on a code line to processor 20, which recognizes a start code request in PROM 22. Processor 20 then sends a serial code to the starter coder/decoder 10. The coder/decoder 10 recognizes the correct code from processor 20 and thereby activates first servo 8. Servo 8 then removes ground at switch 14 from starter motor 4 by switching main contact control arm 14A from ground and permitting starter solenoid contactor 16 to apply start current to starter motor 4 when the solenoid is activated. With main contact control arm 14A in this position, starter solenoid contactor 16 is operated in conventional fashion to allow current to flow from starter battery 18 through starter solenoid contactor 16, power terminal 12, switch 14 and starter motor 4, thereby activating starter motor 4, turning gear to engage flywheel 6 and starting the vehicle's engine. At the same time indicator 15 goes out indicating that the lock-out is deactivated.

The antitheft device, inaccessible from tampering by being within or homogeneous with starter assembly 2, when in its lockout mode, both opens the connection between starter solenoid contactor 16 and starter motor 4 and electrically grounds starter motor 4 thereby disabling the vehicle's starter system and preventing "hot wiring" of that system.

Successful hot wiring is foiled by the grounding feature of the lock-out mode and the homogeneous construction of the starter and antitheft device. A thief is prevented from successfully utilizing a jumper battery placed across starter motor 4's terminals to turn starter motor 4 over by effectively grounding out both terminals of the jumper battery. Specifically, with switch 14 in the lock-out mode, connecting a jumper battery terminal by a cable to the wire leading from indicator 15 into starter assembly 12 and connecting the second terminal of the jumper battery to ground in an attempt to turn starter motor 4 over will cause both terminals of the jumper battery to be grounded. Thus, starter motor 4 will not turn over and, most likely, the cables from the jumper battery will overheat. Furthermore, coder/decoder 10 is connected to automatically lock-out first servo 8 if the computer code is incorrect or if the current from starter battery 18 is cutoff. Since coder/decoder 10, first servo 8 and switch 14 are all an integral part of starter assembly 2, code changes or any other alterations can be made only by removing and opening starter assembly 2. If the computer code is incorrectly entered to coder/decoder 10, the processor 20 has a long repeat time, typically 30 seconds, before a computer code can be reentered to coder/decoder 10. This long repeat time inhibits one from guessing at a plurality of computer codes in order to make coder/decoder 10 activate servo 8.

General purpose lock-out device 30 is a slave unit or a number of slave units which react to the correct serial code from processor 20. Key ignition switch 24 positions 2 and 3 with the coder keypad can be used to cause processor 20 with PROM 22 to generate the correct codes for decoders 34. Consequently, second servo 32 is activated in general purpose lock-out device 30 to lock up the vehicle's transmission, to lock up the vehicle's brakes, and to render other parts of the vehicle in conditions which make it difficult for one to drive the vehicle without first switching the antitheft device to its non-lock-out mode.

General purpose lock-out device 30 can also be utilized on a vehicle to disable an electrical fuel pump. Even if a thief could start the vehicle engine and drive the vehicle a short distance, the engine will stall out due to lack of fuel once the fuel in the fuel line has been depleted since the power to the fuel pump is effectively interrupted by the device in its lockout mode.

In accordance with the general scope of the present invention, starter assembly 2 is the master device with control from processor 20. Starter assembly 2 may be controlled independently from general purpose lock-out devices 30. Alternatively, a master code may be supplied to activate all the devices simultaneously, such as when ready to start and move the vehicle. Furthermore, all of the devices can be programmed to lock-out for a predetermined time after receipt of a wrong code to prevent computer scanning of all codes until the correct one is found, making it impractical to use a computer to break the code at the vehicle.

The lock-out devices for transmissions, brakes, fuel pump, starter, and other devices which may be locked-out are also tamper-proof and require removal and disassembly to alter codes.

It will be apparent to those skilled in the art that modifications can be made to the antitheft device of the instant invention without departing from the scope or spirit of the invention, and it is intended that the present invention cover modifications and variations of the system provided they come within the scope of the appended claims and their equivalents.

What is claimed is:

1. In combination with a motor vehicle having an engine, a battery having a first pole and a second pole, and a starter solenoid contactor, wherein said first pole is connected to said vehicle frame and said starter solenoid contactor is connected to said second pole, an antitheft device comprising:

a. an electrical starter assembly having a casing in which is mounted said electrical starter assembly including, electrical means for starting said engine, said electrical starting means having first and second terminals and means for engaging a flywheel, said first terminal being connected to said vehicle frame, a grounding contact connected to said vehicle frame, a power control contact connected to said starter solenoid contactor, a movable contactor arm resting on said grounding contact when said antitheft device is in a locked mode and contacting said power control contact when said antitheft device is in an unlocked mode, said movable contactor arm being connected to said second terminal of said electrical starting means, servo means having a link connected for moving said movable contactor arm from the grounding contact to said power control contract, a coder/decoder connected to said servo means;

b. an ignition key switch having third and fourth terminals, wherein said third terminal is electrically connected to said second pole of said battery, and said fourth terminal is electrically connected to said coder/decoder for operating said coder/decoder to generate a first code signal in response to said key ignition switch being in a start position; and c. a processor having a coder and a memory, said processor being connected between said key ignition switch and said coder/decoder, said processor including a key pad for generating a second code signal in response to recognizing said first code signal, said processor including means responsive to a correspondence between said first and second code signals for operating said servo means to move said movable contactor arm into engagement with said power control contact to apply current to said starting means.

2. A security lock system for an automobile electric starter motor, which comprises:

a processor means with a key pad means for setting a predetermined code and for comparing received signals with the set code to generate an output signal upon a coincidence of the received signals with the set code;

means for generating signals representative of said predetermined code and applying said generated signals to said processor means;

a switch means operated by a turning of a key for energizing said signal generating means to generate signals representative of said predetermined code;

means for applying said generated signals to said processor, and upon coincidence of the applied generated signals and the set predetermined code, said processor generates the output signal;

contactor means having a normally open contact for applying power to the starter motor; and means responsive to an operation of said key operated switch and the processor output signal for operating said contactor means to apply power to the starter motor.

3. The security lock system as defined in claim 2, which comprises:

means within the processor responsive to removal of the key from said switch means for removing said set code.

4. The security lock system as defined in claim 2, further comprising a secure box in which is located said generator means, said contactor means and said operating means.

* * * * *